US008607205B2

(12) United States Patent
Moudgal (10) Patent No.: US 8,607,205 B2
(45) Date of Patent: Dec. 10, 2013

(54) AUTOMATIC GENERATION OF FUNCTIONAL EMULATORS FOR WEB SERVICE

(75) Inventor: Lakshminarasimha Moudgal, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 1143 days.

(21) Appl. No.: 11/680,954

(22) Filed: Mar. 1, 2007

(65) Prior Publication Data

US 2008/0216059 A1 Sep. 4, 2008

(51) Int. Cl.
*G06F 9/44* (2006.01)
(52) U.S. Cl.
USPC ........... 717/135; 717/124; 717/125; 717/127; 717/134
(58) Field of Classification Search
None
See application file for complete search history.

(56) References Cited

U.S. PATENT DOCUMENTS

| | | | | |
|---|---|---|---|---|
| 7,484,226 B2 * | 1/2009 | Brooks et al. | | 719/330 |
| 7,673,028 B2 * | 3/2010 | Baikov et al. | | 709/223 |
| 7,908,590 B1 * | 3/2011 | Min et al. | | 717/124 |
| 7,954,091 B2 * | 5/2011 | Li et al. | | 717/135 |
| 8,074,204 B2 * | 12/2011 | Comstock et al. | | 717/125 |
| 8,245,201 B2 * | 8/2012 | Genkin et al. | | 717/134 |
| 2003/0220993 A1 * | 11/2003 | Blizniak et al. | | 709/223 |
| 2004/0064503 A1 * | 4/2004 | Karakashian et al. | | 709/203 |
| 2006/0206906 A1 * | 9/2006 | Brooks et al. | | 719/330 |
| 2007/0073851 A1 * | 3/2007 | Baikov et al. | | 709/220 |
| 2007/0220511 A1 * | 9/2007 | Clarke et al. | | 717/174 |
| 2007/0277158 A1 * | 11/2007 | Li et al. | | 717/135 |
| 2008/0120602 A1 * | 5/2008 | Comstock et al. | | 717/125 |
| 2008/0154663 A1 * | 6/2008 | Savur et al. | | 705/7 |
| 2009/0031331 A1 * | 1/2009 | Brooks et al. | | 719/330 |
| 2009/0089039 A1 * | 4/2009 | Shufer et al. | | 703/23 |
| 2010/0198799 A1 * | 8/2010 | Krishnan et al. | | 717/127 |
| 2013/0145352 A1 * | 6/2013 | Bennett et al. | | 717/135 |

OTHER PUBLICATIONS

Jeff Offutt et al.; Generating Test Cases for Web Services Using Data Perturbation; 2004 ACM; 10 pages; <http://dl.acm.org/citation.cfm?id=1022529>.*
Samer Hanna et al.; An Approach for Specification-based Test Case Generation for Web Services; 2007 IEEE; pp. 16-23; <http://ieeexplore.ieee.org/stamp/stamp.jsp?tp=&arnumber=4230934>.*
San-Yih Hwang et al.; A probabilistic approach to modeling and estimating the QoS of web-services-based workflows; 2007 Elsevier Inc.; pp. 5485-5503; <http://www.sciencedirect.com/science/article/pii/S0020025507003295#>.*
Gerardo Canfora et al.; Migrating Interactive Legacy Systems To Web Services; 2006 IEEE; 10 pages; <http://ieeexplore.ieee.org/stamp/stamp.jsp?tp=&arnumber=1602355>.*
Silvia R. Vergilio et al.; Exploring Perturbation Based Testing for Web Services; 2006 IEEE; 8 pages; <http://ieeexplore.ieee.org/stamp/stamp.jsp?tp=&arnumber=40.*
Jason Bloomberg; Testing Web Services Today and Tomorrow; 2002 Rational Software; 8 pages; <http://www.p2080.co.il/go/p2080h/files/4989377677.pdf>.*

* cited by examiner

*Primary Examiner* — Thuy Dao
*Assistant Examiner* — Cuong V Luu
(74) *Attorney, Agent, or Firm* — Yudell Isidore Ng Russell PLLC (57) ABSTRACT

A computer-implemented method, system, and computer-readable medium for emulating web service operations are presented. In a preferred embodiment, the computer-implemented method includes the steps of: collecting Web Services Description Language (WSDL) based descriptors of selected web service operations; receiving range and diversity descriptors for the selected web service operations; and inputting the WSDL based descriptors, range and diversity descriptors into an Automatic Web Service Emulator Generator (AWSEG) to generate a web service emulation of the selected web service operations.

14 Claims, 8 Drawing Sheets

AUTOMATIC GENERATION OF FUNCTIONAL EMULATORS FOR WEB SERVICE

BACKGROUND OF THE INVENTION

1. Technical Field

The present disclosure relates in general to the field of computers, and more particularly to the use of computer software. Still more particularly, the present disclosure relates to the emulation of a web service.

2. Description of the Related Art

Enterprise-level systems, which involve complex integration of functional components, typically require end-to-end testing prior to deployment into production. In many industries, such as finance and banking, the feasibility of fall-scale testing is often hindered by a lack of test data and/or a lack of functional components. This shortcoming is usually traceable to security and privacy issues, as well as to the lack of time and resources required to configure functional components for operating in test mode.

The use of "web services" as an integration paradigm has recently found widespread acceptance in the software services industry, primarily due to the web services' ability to integrate heterogeneous components in a loosely coupled manner. While such web services are an efficient means for leveraging software resources, testing all or a portion of these services is difficult, if not impossible, without monopolizing, or possibly damaging, services and supported operations provided by the web services.

SUMMARY OF THE INVENTION

To address the problem described above, the present disclosure presents a computer-implemented method, system and computer-readable medium for emulating web service operations. In a preferred embodiment, the computer-implemented method includes the steps of: collecting Web Services Description Language (WSDL) based descriptors of selected web service operations; receiving range and diversity descriptors for the selected web service operations; and inputting the WSDL based descriptors, range and diversity descriptors into an Automatic Web Service Emulator Generator (AWSEG) to generate a web service emulation of the selected web service operations. The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1A:
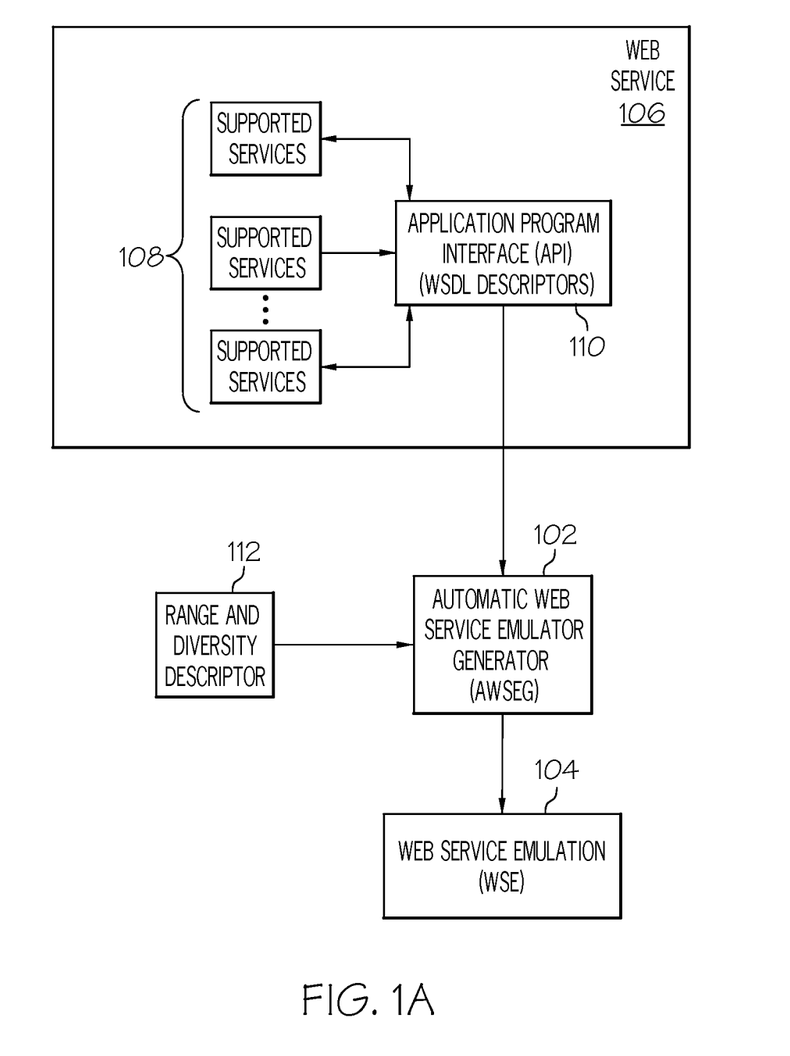
FIG. 1A depicts inputs and outputs to an Automatic Web Service Emulator Generator (AWSEG) using Web Services Description Language (WSDL) descriptors.

With reference now to the figures, and in particular to FIG. 1A, there is depicted an environment for enabling the use of an Automatic Web Service Emulator Generator (AWSEG) 102. As described herein, AWSEG 102 is used to generate a Web Service Emulation (WSE) 104, which emulates, but does not have the full capabilities of, a Web Service 106.

Web Service 106 includes multiple supported services 108, which include, but are not limited to, software packages, web services operating on disparate servers, support, etc. An exemplary Web Service 106 is IBM's WebSphere™, which runs on IBM's WebSphere Application Server (WAS™). WebSphere uses middleware software that is designed to set up, operate and integrate e-business applications across multiple computing platforms using Web technologies. These different e-business applications are referred to herein as supported services 108. The different supported services 108 communicate among themselves via Application Program Interfaces (APIs) 110, which, in an exemplary manner, utilize Web Services Description Language (WSDL) descriptors. APIs 110 describe formats, responses and other information about messages that are sent between supported services 108, but do not include the logic found within the supported services 108 that actually process data in the messages. Nonetheless, these APIs 110, and particularly those that are WSDL compliant, provide enough information to create a high-level emulation (WSE 104) of Web Service 106. For reasons described further below, a range and diversity descriptor 112 is also input into AWSEG 102, in order to create a WSE 104 that is tailored for a particular use.

Figure 1B:
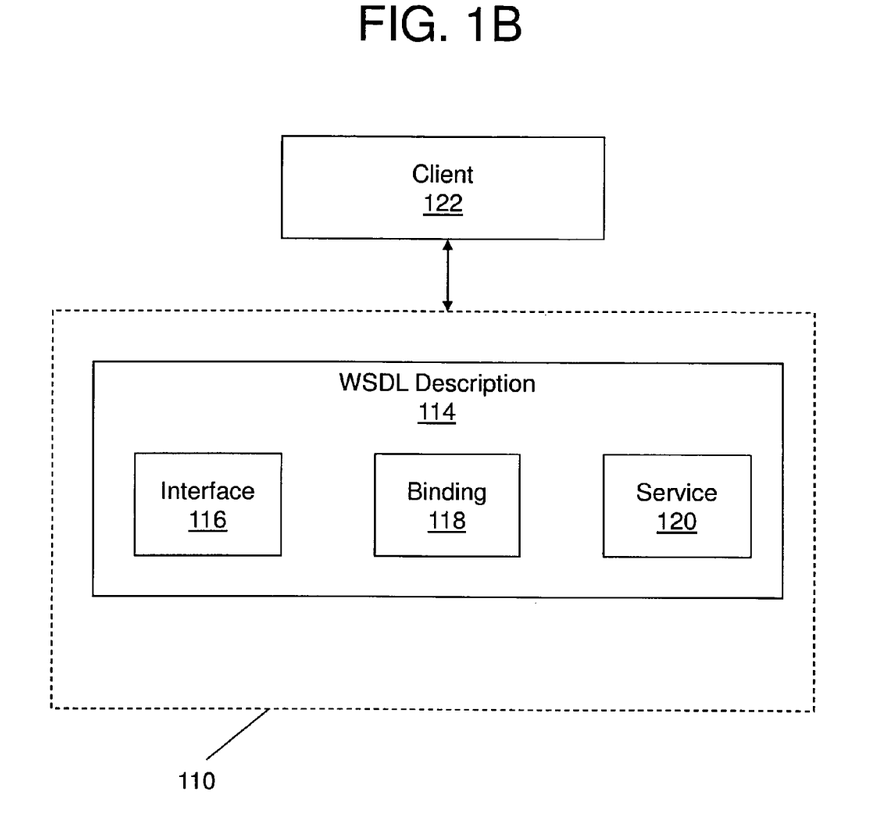
FIG. 1B illustrates certain components of WSDL descriptors.

Referring now to FIG. 1B, an overview of WSDL, as used in an exemplary manner by APIs 110, is presented. As noted herein, WSDL is an eXtended Markup Language (XML) based service description that defines services, such as supported services 108, as collections of network endpoints (ports). A port is defined by associating a network address with a reusable binding. A collection of ports defines a service (e.g., Web Service 106). The messages between ports are abstract descriptions of data that is being exchanged between services. Port types are abstract collections of supported operations. Protocol and data format specifications for a particular port type constitutes a reusable binding, such that messages and operations are bound to a concrete network protocol and message format. Thus, WSDL describes a public interface to the web service.

Each API 110 includes a WSDL description 114 for a particular service (e.g., one of the supported services 108). This descriptor describes how messages are handled by that particular service. Each WSDL description 114 comprises an interface 116, a binding 118, and a service 120.

Interface 116 defines an abstract interface, for service 120, as a set of abstract operations, each operation representing a simple interaction between a client 122 and service 120. Each operation specifies the types of messages that service 120 can send or receive as part of that operation. Each operation also defines message exchange patterns, which indicate a sequence in which associated messages are transmitted between supported services 108. An exemplary sequence for a synchronous message would be "Send:Response", in which a Send message always results in a Response message.

Binding 118 describes details for each operation using operation and fault elements within the binding 118. That is, a binding 118 is an extension used by messages that describes two attributes of a message—the name attribute and the type attribute. The name attribute, which is user defined, is the name of the binding. The type attribute points to a specific port (in service 120) used by the binding. Thus, binding 118 provides concrete information for messages regarding what protocol is being used, how data in the message is being transported, and where the service 120 is located.

Service 120 includes a descriptor that defines a single interface that service 120 will support, and a list of endpoint locations where service 120 can be accessed. Each endpoint must also reference a previously defined binding 118 to indicate what protocols and transmission formats are to be used at that endpoint.

Figure 2:
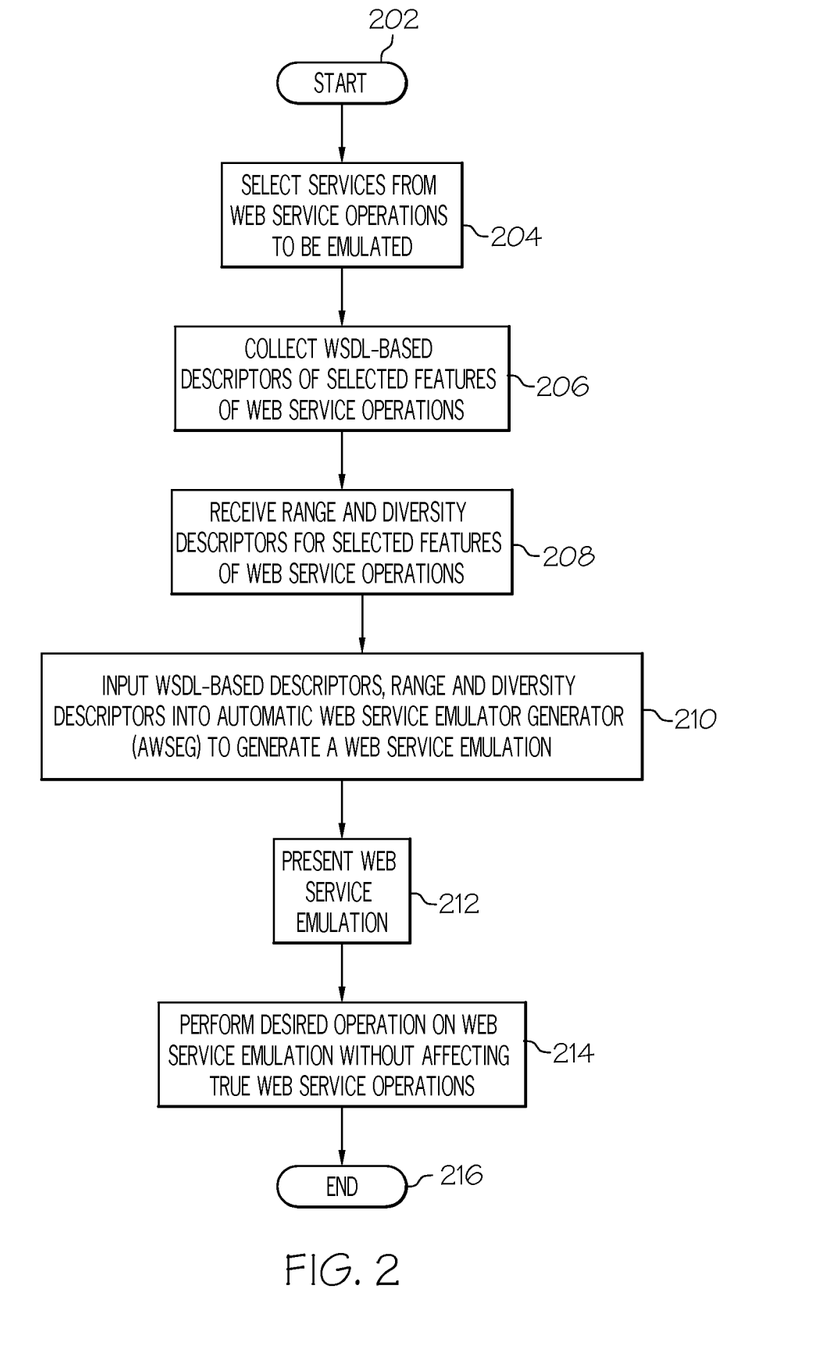
FIG. 2 is a flow-chart of exemplary steps taken to create a web service emulation using the AWSEG.

Referring now to FIG. 2, a flow-chart of exemplary steps taken to generate an emulation of a web service is presented. After initiator block 202, specific supported services of a web service (such as certain chosen supported services 108 found in web service 106 shown in FIG. 1A) are selected for emulation (block 204). Note that in a preferred embodiment, only some (but not all) supported services are selected for emulation. Note also that, in the preferred embodiment, the emulation does not provide full functionality of the selected services, but rather provides a limited emulation that is based on the interfaces between the selected services. That is, the emulation does not emulate the internal logic of each supported service (i.e., web service operations), but only provides a limited description of the supported services based on their API interfaces. As soon as the selected services are identified, API's between the selected services (e.g., WSDL-based descriptors described above) are collected (block 206).

As shown in block 208, range and diversity descriptors for the selected features are then chosen and received by the AWSEG 102. These range and diversity descriptors are preferably chosen by a user, and define parameters of services needed to be emulated. For example, assume that a service handles credit card balances. Rather than emulate the service for handling all credit card numbers for all types of credit cards, the parameter may be set to emulate services for only American Express™ cards that have leading numbers between "5000" and "7000."

As described in block 210, the WSDL-based descriptors, range and diversity descriptors are then inputted into the AWSEG to generate a web service emulation. As described above, this emulation does not replicate the actual functional logic found in services, but rather emulates these services based on how the services handle messages. Thus, while detailed logic within a particular service cannot be tested, the overall system (within the user-defined parameters) can be tested to evaluate system interactions, message handling, sufficiency of services, etc. The abbreviated emulation of the web service is then presented (block 212) to a user. The user can then use the emulation to test the web service (block 214), by inputting data, messages, etc., and observing how such inputs are handled. Thus, the web service can be tested "off line" while not impacting ("touching") the actual web service itself. The process ends at terminator block 216.

Figure 3:
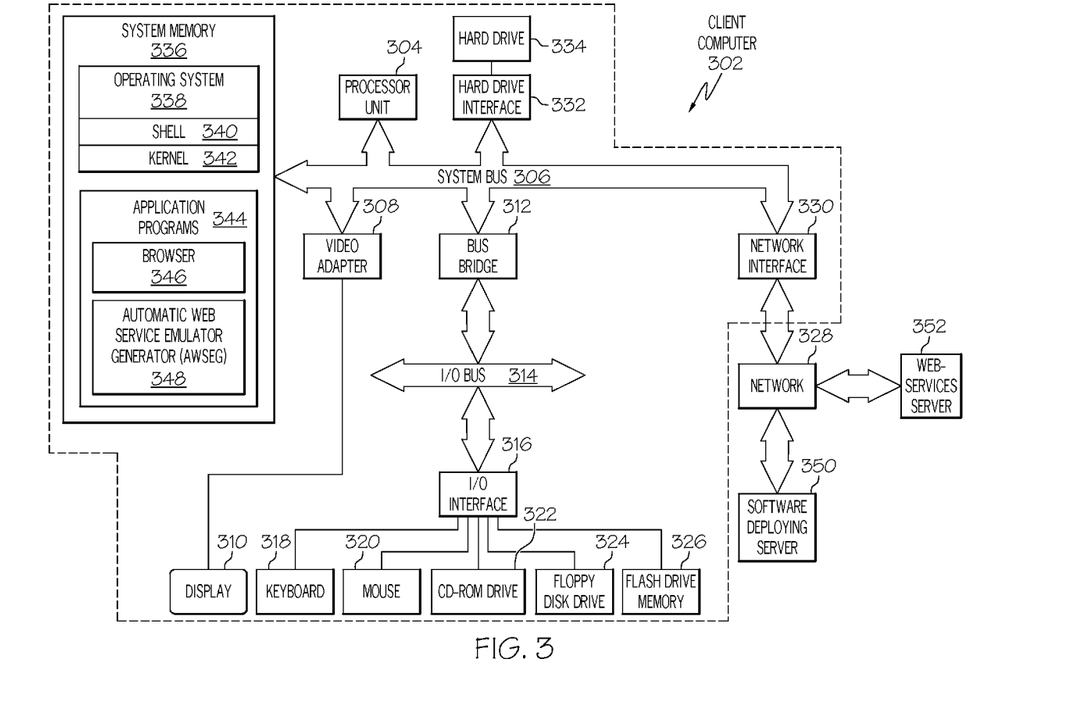
FIG. 3 illustrates an exemplary computer in which the present invention may be utilized.

With reference now to FIG. 3, there is depicted a block diagram of an exemplary client computer 302, in which the present invention may be utilized. Note that some or all of the exemplary architecture shown for client computer 302 may be utilized by a software deploying server 350 and a web-services server 352.

Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with software deploying server 350 and web-services server 352 via a network 328 using a network interface 330, which is coupled to system bus 306. Network 328 may be an external network such as the Internet, or an internal network such as an Ethernet or a Virtual Private Network (VPN).

A hard drive interface 332 is also coupled to system bus 306. Hard drive interface 332 interfaces with a hard drive 334. In a preferred embodiment, hard drive 334 populates a system memory 336, which is also coupled to system bus 306. System memory is defined as a lowest level of volatile memory in client computer 302. This volatile memory includes additional higher levels of volatile memory (not shown), including, but not limited to, cache memory, registers and buffers. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with software deploying server 350.

Application programs 344 in client computer 302's system memory (as well as software deploying server 350's system memory) also include an Automatic Web Service Emulator Generator (AWSEG) 348. AWSEG 348 includes code for implementing the processes described in FIGS. 1A-2. In one embodiment, client computer 302 is able to download AWSEG 348 from software deploying server 350. As described above, AWSEG 348 is able to provide a limited emulation of some or all of a web service (e.g., Web Service 106 described in FIG. 1A) that is provided and managed by Web services server 352 (e.g., the WAS™ described above).

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 350 performs all of the functions associated with the present invention (including execution of AWSEG 348), thus freeing client computer 302 from having to use its own internal computing resources to execute AWSEG 348.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of AWSEG 348, are performed by service provider server 350. Alternatively, AWSEG 348 and the method described herein, and in particular as shown and described in FIGS. 1A-2, can be deployed as process software from service provider server 350 to client computer 302. Still more particularly, process software for the method so described may be deployed to service provider server 350 by another service provider server (not shown).

Figure 4A:
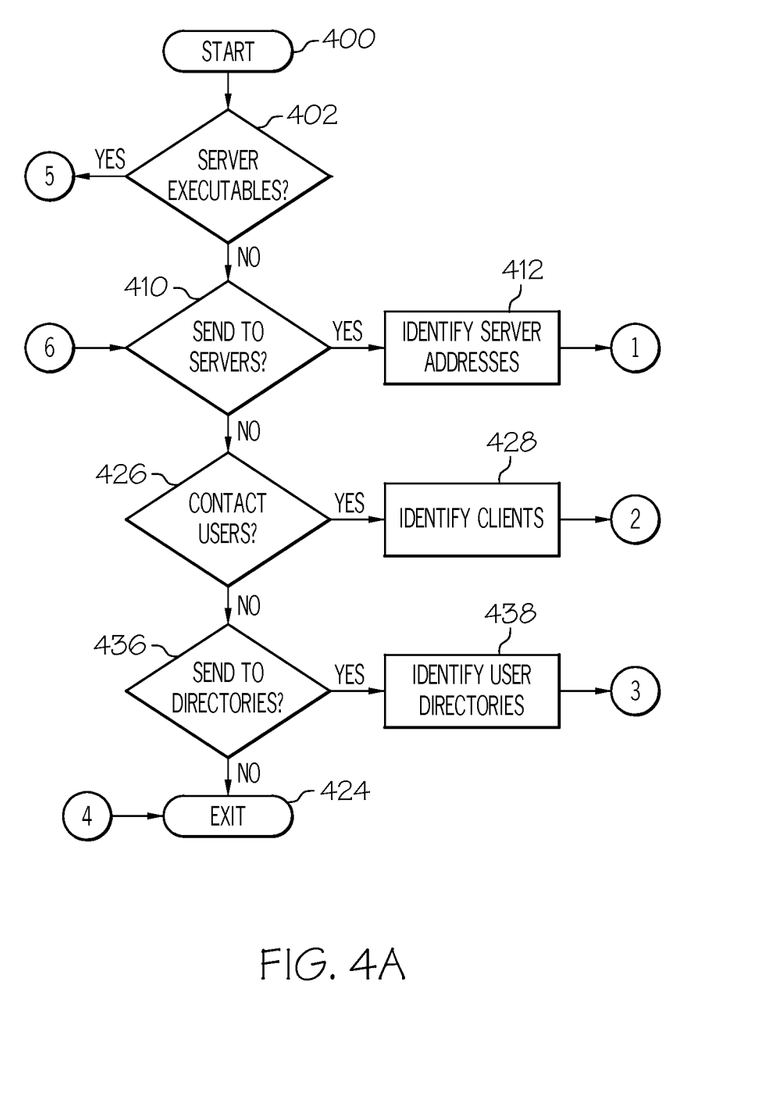
FIGS. 4A-B are flow-charts showing steps taken to deploy software capable of executing the steps described in FIGS. 1A-2.
Figure 4B:
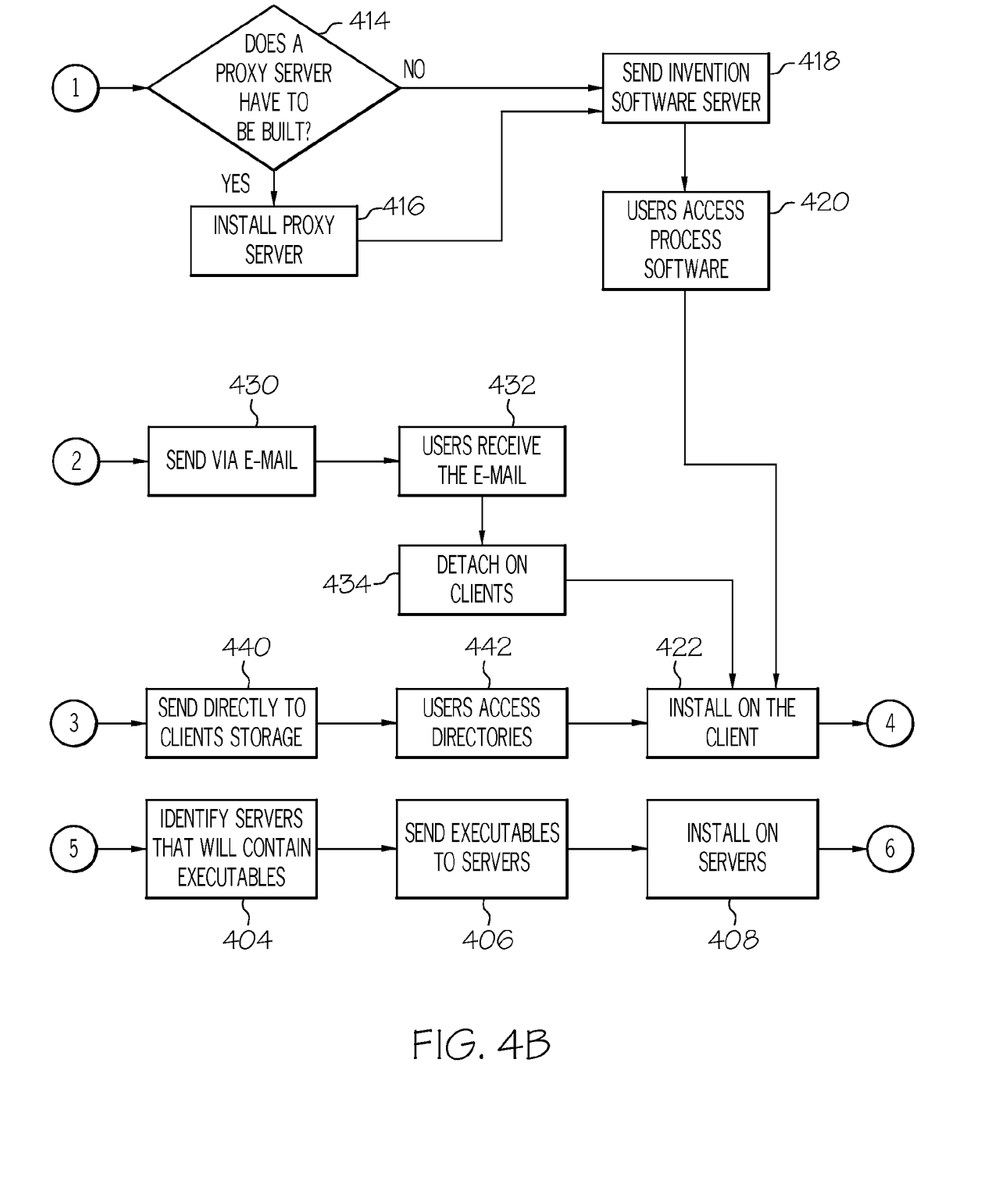

Referring then to FIGS. 4A-B, step 400 begins the deployment of the process software. The first thing is to determine if there are any programs that will reside on a server or servers when the process software is executed (query block 402). If this is the case, then the servers that will contain the executables are identified (block 404). The process software for the server or servers is transferred directly to the servers' storage via File Transfer Protocol (FTP) or some other protocol or by copying though the use of a shared file system (block 406). The process software is then installed on the servers (block 408).

Next, a determination is made on whether the process software is to be deployed by having users access the process software on a server or servers (query block 410). If the users are to access the process software on servers, then the server addresses that will store the process software are identified (block 412).

A determination is made if a proxy server is to be built (query block 414) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 416). The process software is sent to the servers either via a protocol such as FTP or it is copied directly from the source files to the server files via file sharing (block 418). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 420). Another embodiment is to have the servers automatically copy the process software to each client and then run the installation program for the process software at each client computer. The user executes the program that installs the process software on his client computer (block 422) then exits the process (terminator block 424).

In query step 426, a determination is made whether the process software is to be deployed by sending the process software to users via e-mail. The set of users where the process software will be deployed are identified together with the addresses of the user client computers (block 428). The process software is sent via e-mail to each of the users' client computers (block 430). The users then receive the e-mail (block 432) and then detach the process software from the e-mail to a directory on their client computers (block 434). The user executes the program that installs the process software on his client computer (block 422) then exits the process (terminator block 424).

Lastly a determination is made as to whether the process software will be sent directly to user directories on their client computers (query block 436). If so, the user directories are identified (block 438). The process software is transferred directly to the user's client computer directory (block 440). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 442). The user executes the program that installs the process software on his client computer (block 422) and then exits the process (terminator block 424).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds or hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage, etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 5A:
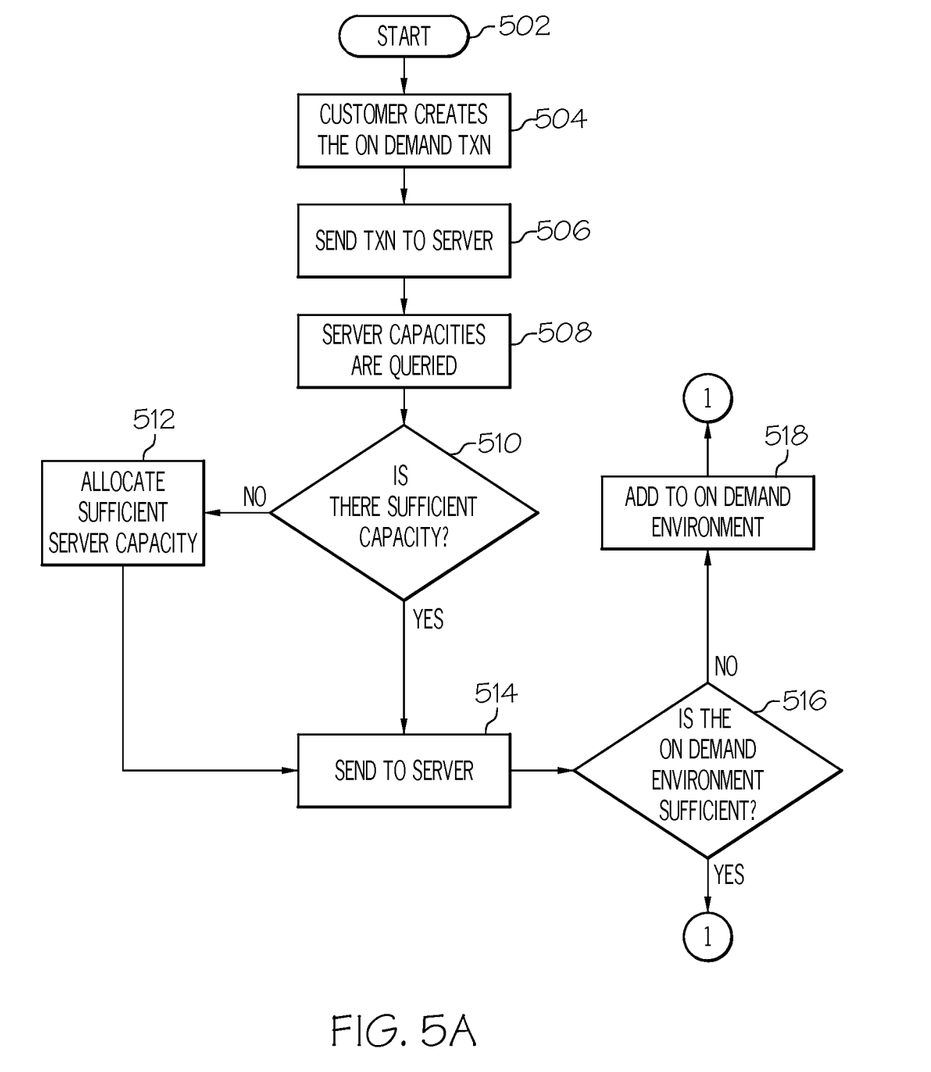
FIGS. 5A-B are flow-charts showing steps taken to execute the steps shown in FIGS. 1A-2 using an on-demand service provider.
Figure 5B:
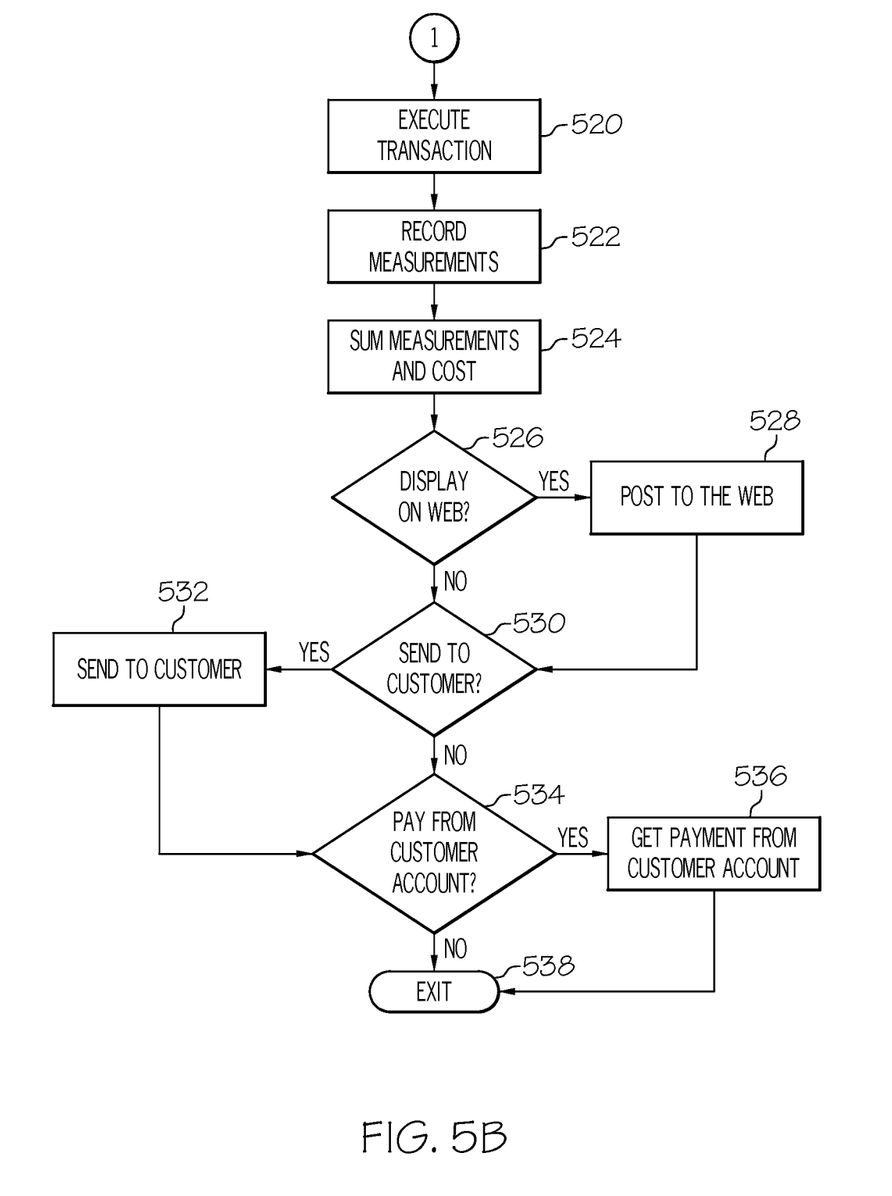

With reference now to FIGS. 5A-B, initiator block 502 begins the On Demand process. A transaction is created than contains the unique customer identification, the requested service type and any service parameters that farther specify the type of service (block 504). The transaction is then sent to the main server (block 506). In an On Demand environment the main server can initially be the only server, then as capacity is consumed other servers are added to the On Demand environment.

The server central processing unit (CPU) capacities in the On Demand environment are queried (block 508). The CPU requirement of the transaction is estimated, then the server available CPU capacities in the On Demand environment are compared to the transaction CPU requirement to see if there is sufficient CPU available capacity in any server to process the transaction (query block 510). If there is not sufficient server CPU available capacity, then additional server CPU capacity is allocated to process the transaction (block 512). If there was already sufficient available CPU capacity then the transaction is sent to a selected server (block 514).

Before executing the transaction, a check is made of the remaining On Demand environment to determine if the environment has sufficient available capacity for processing the transaction. This environment capacity consists of such things as but not limited to network bandwidth, processor memory, storage etc. (block 516). If there is not sufficient available capacity, then capacity will be added to the On Demand environment (block 518). Next the required software to process the transaction is accessed, loaded into memory, then the transaction is executed (block 520).

The usage measurements are recorded (block 522). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 524).

If the customer has requested that the On Demand costs be posted to a web site (query block 526), then they are posted (block 528). If the customer has requested that the On Demand costs be sent via e-mail to a customer address (query block 530), then these costs are sent to the customer (block 532). If the customer has requested that the On Demand costs be paid directly from a customer account (query block 534), then payment is received directly from the customer account (block 536). The On Demand process is then exited at terminator block 538.

As described herein, the present disclosure presents a computer-implemented method, system, and computer-readable medium for emulating web service operations. In a preferred embodiment, the computer-implemented method includes the steps of: collecting Web Services Description Language (WSDL) based descriptors of selected web service operations; receiving range and diversity descriptors for the selected web service operations; and inputting the WSDL based descriptors, range and diversity descriptors into an Automatic Web Service Emulator Generator (AWSEG) to generate a web service emulation of the selected web service operations. In one embodiment, the method further includes the steps of presenting the web service emulation to a user; and testing the selected web service by using the web service emulation, wherein testing through the use of the web service emulation does not utilize true instances of the selected web service operations. As described herein, the range and diversity descriptors may define a limited portion of the selected web service to be emulated.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method for emulating web service operations on a client computer, the method comprising:

the client computer selecting one or more supported services for emulation from a plurality of supported services of a web service on a web-services server;

in response to selecting the one or more supported services, the client computer collecting, from the web-services server, one or more application programming interfaces (APIs) between the selected one or more supported services and Web Services Description Language (WSDL) based descriptors that are utilized by the one or more APIs, wherein an API describes formats, responses and information about messages sent between the plurality of supported services;

the client computer receiving chosen range and diversity descriptors for the selected one or more supported services, wherein the range and diversity descriptors define parameters of a supported service requiring emulation;

inputting the WSDL based descriptors and range and diversity descriptors into an Automatic Web Service Emulator Generator (AWSEG) executing at the client computer;

the AWSEG generating, at the client computer based on the API interfaces between the selected one or more supported services, an abbreviated web service emulation from the WSDL based descriptors and range and diversity descriptors that emulates the selected one or more supported services without replicating functional logic of the selected one or more supported services, wherein the abbreviated web service emulation emulates the one or more supported services based on how the one or more supported services handle messages;

the client computer presenting the abbreviated web service emulation to a user; and the client computer testing the one or more supported services using the abbreviated web service emulation.

2. The computer-implemented method of claim 1, wherein:

each WSDL based descriptor includes:

an interface comprising a set of operations, each operation representing a simple interaction between a client and a service, wherein each operation also defines message exchange patterns that indicate a sequence in which associated messages are transmitted between supported services;

a binding providing information on a protocol being used, how data is being transported, and a service operation is located, wherein the binding describes a user defined name attribute and a type attribute pointing to a specific endpoint used by the binding of a message; and a service having a descriptor that defines a single interface that service will support, and a list of endpoint locations where service can be accessed;

the plurality of supported services of a web service are e-business applications; and the range and diversity descriptors define a limited portion of the selected one or more supported services to be emulated.

3. The computer-implemented method of claim 1, further comprising:

testing the abbreviated web service emulation at the client computer while offline, wherein the abbreviated web service emulation when tested offline does not impact the selected one or more supported services.

4. The computer-implemented method of claim 1, wherein the client computer is a software deploying server, the method further comprising:

the software deploying server creating a process software from the abbreviated web service emulation;

providing the abbreviated web service emulation for download to one or more client computers;

determining whether the process software is to be deployed to a proxy server;

in response to determining the process software is to be deployed to a proxy server, the software deploying server:
installing the proxy server; and
deploying the process software to the proxy server;

determining whether the process software is to be deployed to a set of users via electronic mail; and in response to determining the process software is to be deployed to a set of users via electronic mail, the software deploying server sending the process software within an electronic mail to a set of client computers identified by email addresses associated with the set of users.

5. A client computer system comprising:
a processor;
a data bus coupled to the processor;
a memory coupled to the data bus; and
a computer-readable storage medium embodying computer program code having instructions configured for emulating web service operations that when executed by the processor:
selects one or more supported services for emulation from a plurality of supported services of a web service on a web-services server;
in response to selecting the one or more supported services, collects, from the web-services server, one or more application programming interfaces (APIs) between the selected one or more supported services and Web Services Description Language (WSDL) based descriptors that are utilized by the one or more APIs, wherein an API describes formats, responses and information about messages sent between the plurality of supported services;
receives chosen range and diversity descriptors for the selected one or more supported services, wherein the range and diversity descriptors define parameters of a supported service requiring emulation;
receives chosen range and diversity descriptors for the selected one or more supported services, wherein the range and diversity descriptors define parameters of a web service operation requiring emulation;
inputs the WSDL based descriptors and range and diversity descriptors into an Automatic Web Service Emulator Generator (AWSEG) executing at the client computer system;
generates, at the client computer system based on the interfaces between the selected one or more supported services, an abbreviated web service emulation from the WSDL based descriptors and range and diversity descriptors that emulates the selected one or more supported services without replicating functional logic of the selected one or more supported services, wherein the abbreviated web service emulation emulates the selected one or more supported services based on how the selected one or more supported services handle messages;
presents the abbreviated web service emulation to a user; and
tests the selected one or more supported services using the abbreviated web service emulation.

6. The system of claim 5, wherein:
each WSDL based descriptor includes:
an interface comprising a set of operations, each operation representing a simple interaction between a client and a service, wherein each operation also defines message exchange patterns that indicate a sequence in which associated messages are transmitted between supported services;
a binding providing information on a protocol being used, how data is being transported, and a service operation is located, wherein the binding describes a user defined name attribute and a type attribute pointing to a specific endpoint used by the binding of a message; and
a service having a descriptor that defines a single interface that service will support, and a list of endpoint locations where service can be accessed;
the plurality of supported services of a web service are e-business applications; and
the range and diversity descriptors define a limited portion of the selected one or more supported services to be emulated.

7. The system of claim 5, wherein the computer program code further comprises instructions that when executed by the processor:
tests the abbreviated web service emulation at the client computer system while offline, wherein the abbreviated web service emulation when tested offline does not impact the selected one or more supported services.

8. The system of claim 5, wherein the client computer system is a software deploying server, the computer program code further comprising instructions that when executed by the processor:
creates a process software from the abbreviated web service emulation;
provides the abbreviated web service emulation for download to one or more client computers;
determines whether the process software is to be deployed to a proxy server;
in response to determining the process software is to be deployed to a proxy server:
installs the proxy server; and
deploys the process software to the proxy server;
determines whether the process software is to be deployed to a set of users via electronic mail; and
in response to determining the process software is to be deployed to a set of users via electronic mail, sends the process software within an electronic mail to a set of client computers identified by email addresses associated with the set of users.

9. A non-transitory computer-readable storage device embodying computer program code for emulating web service operations, the computer program code comprising computer executable instructions configured for:
selecting one or more supported services for emulation from a plurality of supported services of a web service on a web-services server;
in response to selecting the one or more supported services collecting, from the web-services server, one or more application programming interfaces (APIs) between the selected one or more supported services and Web Services Description Language (WSDL) based descriptors that are utilized by the one or more APIs, wherein an API describes formats, responses and information about messages sent between the plurality of supported services;
receiving chosen range and diversity descriptors for the selected one or more supported services, wherein the range and diversity descriptors define parameters of a supported service requiring emulation;

inputting the WSDL based descriptors and range and diversity descriptors into an Automatic Web Service Emulator Generator (AWSEG) executing at a client computer;

generating, at the client computer based on the API interfaces between the selected one or more supported services, an abbreviated web service emulation from the WSDL based descriptors and range and diversity descriptors that emulates the selected one or more supported services without replicating functional logic of the selected one or more supported services, wherein the abbreviated web service emulation emulates the one or more supported services based on how the one or more supported services handle messages;

presenting the abbreviated web service emulation to a user; and testing the selected one or more supported services using the abbreviated web service emulation.

10. The computer-readable storage device of claim 9, wherein:

each WSDL based descriptor includes:
- an interface comprising a set of operations, each operation representing a simple interaction between a client and a service, wherein each operation also defines message exchange patterns that indicate a sequence in which associated messages are transmitted between supported services;
- a binding providing information on a protocol being used, how data is being transported, and a service operation is located, wherein the binding describes a user defined name attribute and a type attribute pointing to a specific endpoint used by the binding of a message; and
- a service having a descriptor that defines a single interface that service will support, and a list of endpoint locations where service can be accessed;

the plurality of supported services of a web service are e-business applications; and the range and diversity descriptors define a limited portion of the selected one or more supported services to be emulated.

11. The computer-readable storage device of claim 9, wherein the computer-readable storage medium is a component of a remote server, and wherein the computer executable instructions are deployable to the client computer from the remote server.

12. The computer-readable storage device of claim 9, wherein the computer executable instructions are provided by a service provider to a customer on an on-demand basis.

13. The computer-readable storage device of claim 9, wherein the computer executable instructions are further configured for:

testing the abbreviated web service emulation at the client computer while offline, wherein the abbreviated web service emulation when tested offline does not impact the selected one or more supported services.

14. The computer-readable storage device of claim 9, wherein the client computer is a software deploying server, the computer executable instructions are further configured for:

creating a process software from the abbreviated web service emulation;

providing the abbreviated web service emulation for download to one or more client computers;

determining whether the process software is to be deployed to a proxy server;

in response to determining the process software is to be deployed to a proxy server:

installing the proxy server; and deploying the process software to the proxy server;

determining whether the process software is to be deployed to a set of users via electronic mail; and in response to determining the process software is to be deployed to a set of users via electronic mail, sending the process software within an electronic mail to a set of client computers identified by email addresses associated with the set of users.

\* \* \* \* \*